United States Patent
Cisewski

(10) Patent No.: US 7,717,501 B1
(45) Date of Patent: May 18, 2010

(54) PORTABLE OUTDOORS CHAIR SYSTEM

(76) Inventor: Robert J. Cisewski, 34496 Luena La., Winona, MN (US) 55987

( * ) Notice: Subject to any disclaimer, the term of this patent is extended or adjusted under 35 U.S.C. 154(b) by 0 days.

(21) Appl. No.: 12/140,562

(22) Filed: Jun. 17, 2008

(51) Int. Cl.
*A47C 9/10* (2006.01)
*A47C 7/62* (2006.01)
*A47C 15/00* (2006.01)

(52) U.S. Cl. .................. 297/4; 297/188.01; 224/576
(58) Field of Classification Search .............. 297/4, 297/451.6, 451.5, 451.4, 183.1, 217.1, 188.01; 182/116; 248/520, 530, 155.2, 155; 224/576
See application file for complete search history.

(56) References Cited

U.S. PATENT DOCUMENTS

| | | | |
|---|---|---|---|
| 180,074 A * | 7/1876 | Skinner | .................. 248/155.2 |
| 4,061,202 A | 12/1977 | Campbell | |
| 4,257,490 A | 3/1981 | Bandy | |
| 4,552,246 A | 11/1985 | Thomas | |
| 4,787,476 A | 11/1988 | Lee | |
| 4,930,839 A | 6/1990 | Saito et al. | |
| 5,253,732 A | 10/1993 | Daniels | |
| 5,275,257 A | 1/1994 | Robertson | |
| D344,346 S | 2/1994 | Lobozzo | |
| 5,327,994 A | 7/1994 | Smith | |
| 5,454,445 A | 10/1995 | Berryman | |
| 5,673,966 A * | 10/1997 | Morton, Jr. | .................... 297/4 |
| 6,155,646 A | 12/2000 | Sisson | |
| 6,217,113 B1 * | 4/2001 | Knatz | .................. 297/118 |
| 2008/0047992 A1 * | 2/2008 | Fabian | .................. 224/275 |

OTHER PUBLICATIONS

Zeke's Seats, <available at http://www.zekesseats.com/index.html>, May 27, 2008, 2 pages.

* cited by examiner

*Primary Examiner*—Milton Nelson, Jr.

(57) ABSTRACT

A portable outdoors chair system for efficiently allowing an individual to sit comfortably against a stationary object, such as a tree. The portable outdoors chair system generally includes an elongated primary support to be leaned against a stationary object from a ground surface in a transverse manner and a seat extending from the primary support. The first end of the primary support defines an acute angle with the stationary object towards a lower end of the stationary object and an opposing second end of the primary support defines an acute angle with the stationary object towards the lower end. The seat extends from the stationary support in a manner as to define an acute angle with the primary support towards the second end in a manner to have the seat positioned in a horizontal configuration.

20 Claims, 7 Drawing Sheets

PORTABLE OUTDOORS CHAIR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to outdoor chairs and more specifically it relates to a portable outdoors chair system for efficiently allowing an individual to sit comfortably against a stationary object, such as a tree.

2. Description of the Related Art

Any discussion of the related art throughout the specification should in no way be considered as an admission that such related art is widely known or forms part of common general knowledge in the field.

Outdoor activities, such as bird watching and hunting have been performed for years. It is often desirable after hiking in the outdoors to sit down upon a chair, rather than sitting upon the ground which can be uncomfortable and wet. This may be especially evident when hunting, wherein it is generally required to sit in a still manner for extended periods of time while hunting.

Many outdoor chairs currently sold are bulky and thus difficult to carry along with the hiker or hunter for extended periods of time and through rough terrain. Another problem with commonly sold chairs is that the chairs may be difficult to set up and require separate tools. Because of the inherent problems with the related art, there is a need for a new and improved portable outdoors chair system for efficiently allowing an individual to sit comfortably against a stationary object, such as a tree.

BRIEF SUMMARY OF THE INVENTION

The general purpose of the present invention is to provide a portable outdoors chair system that has many of the advantages of the outdoor chairs mentioned heretofore. The invention generally relates to an outdoor chair which includes an elongated primary support to be leaned against a stationary object from a ground surface in a transverse manner and a seat extending from the primary support. The first end of the primary support defines an acute angle with the stationary object towards a lower end of the stationary object and an opposing second end of the primary support defines an acute angle with the stationary object towards the lower end. The seat extends from the stationary support in a manner as to define an acute angle with the primary support towards the second end in a manner to have the seat positioned in a horizontal configuration.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments of being practiced and carried out in various ways. Also, it is to be understood that the phraseology and terminology employed herein are for the purpose of the description and should not be regarded as limiting.

An object is to provide a portable outdoors chair system for efficiently allowing an individual to sit comfortably against a stationary object, such as a tree or a fence post.

Another object is to provide a portable outdoors chair system that is easy to set up and may be set up quietly.

An additional object is to provide a portable outdoors chair system that is adjustable to accommodate various size stationary objects and various size individuals.

A further object is to provide a portable outdoors chair system that provides a comfortable seat for the user.

Another object is to provide a portable outdoors chair system that includes an attachment device for securing a quiver and arrows that may be utilized while bow hunting.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
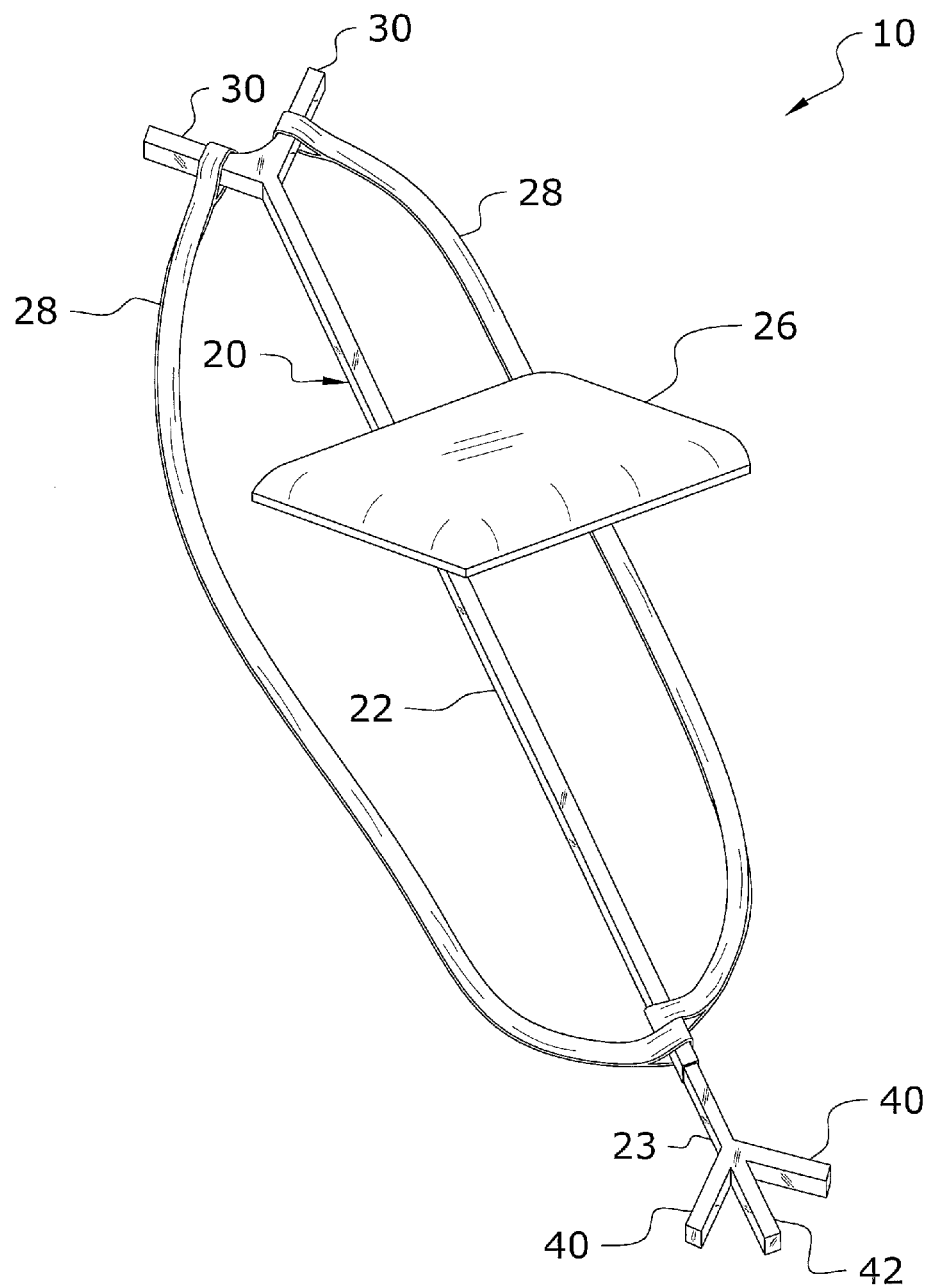
FIG. 1 is an upper perspective view of the present invention.
Figure 2:
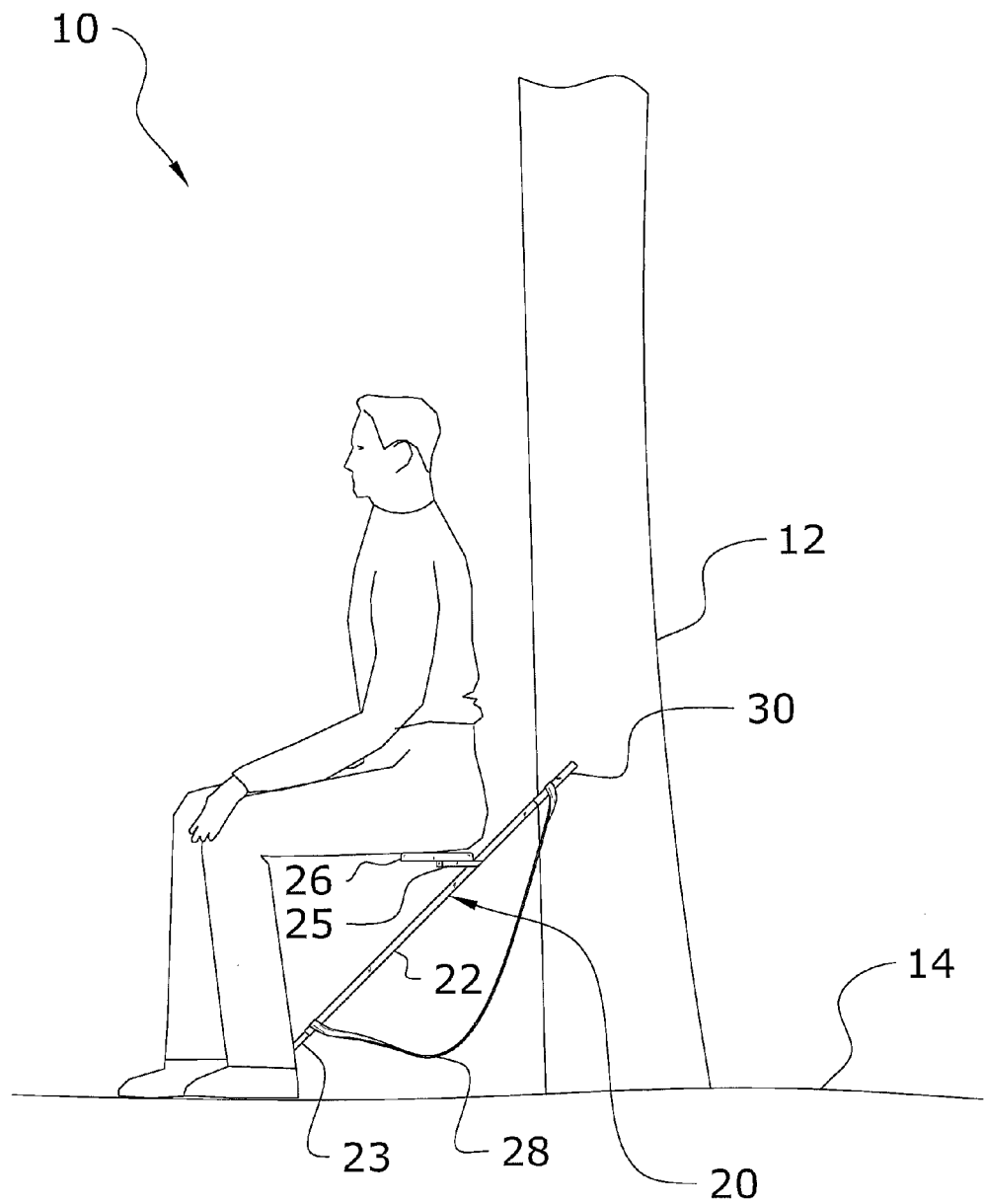
FIG. 2 is a side view of the present invention in use and positioned against a tree (i.e. stationary object).
Figure 3:
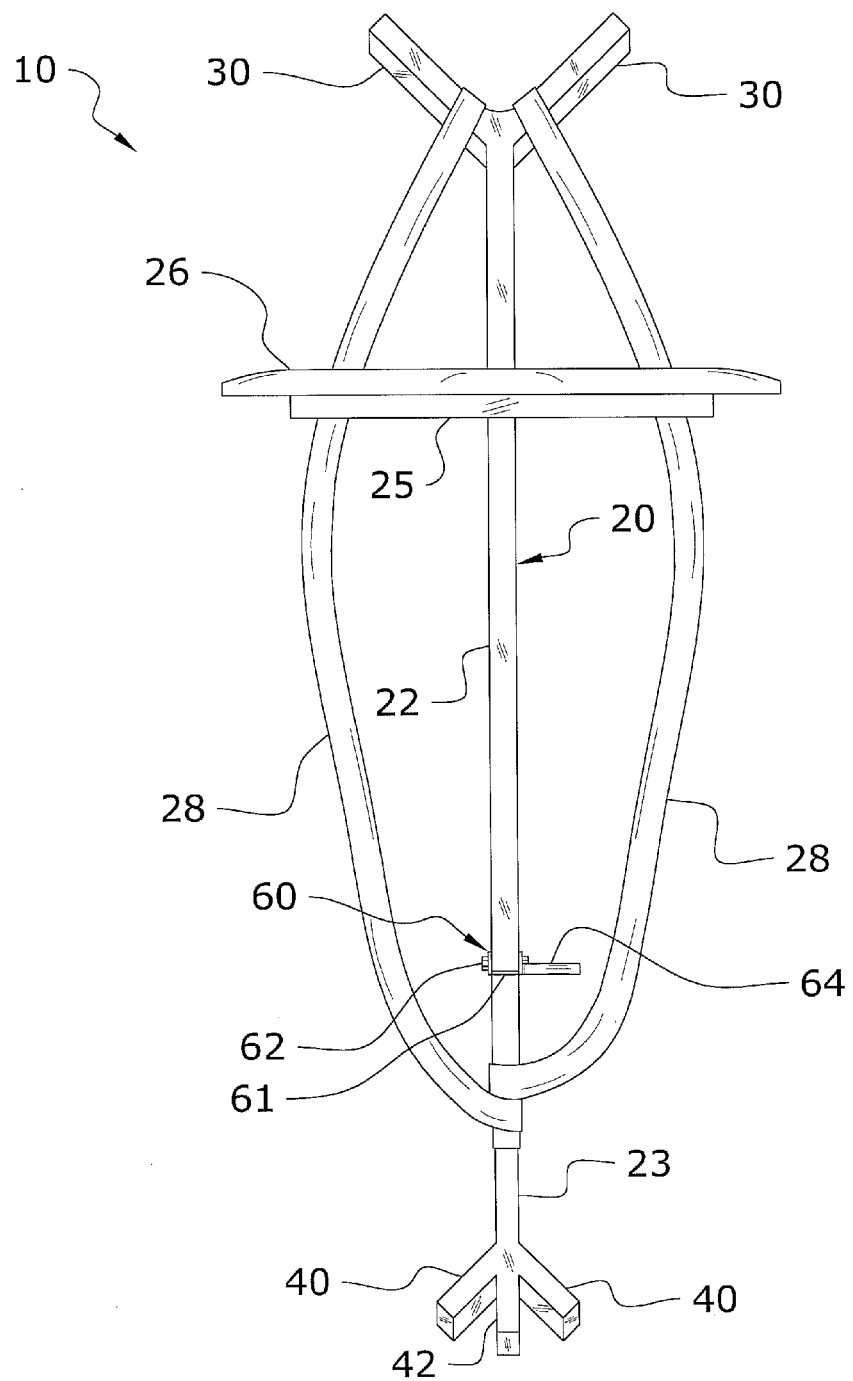
FIG. 3 is a front view of an alternate configuration of the present invention.
Figure 4:
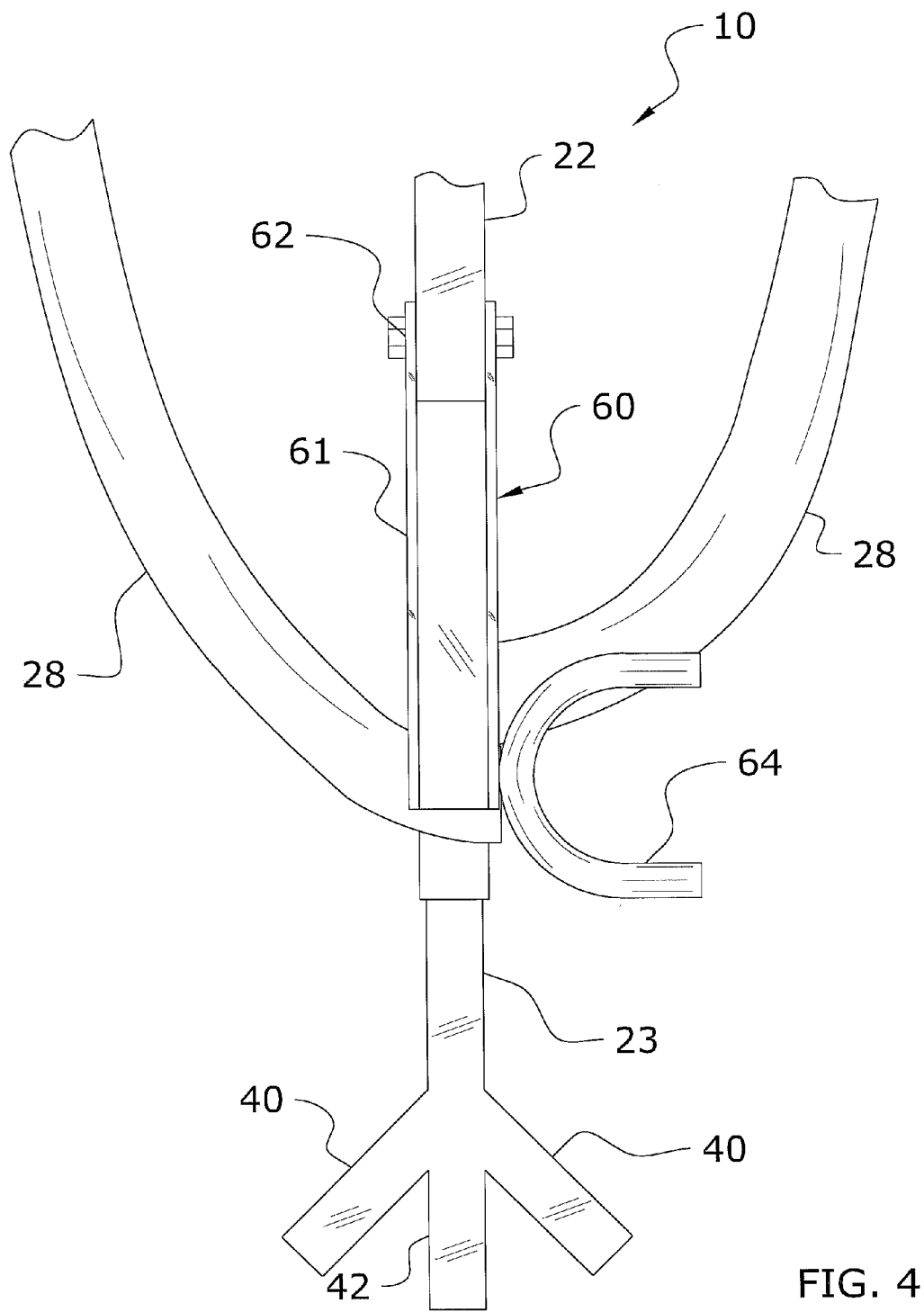
FIG. 4 is a magnified front view of the second accessory support.
Figure 5:
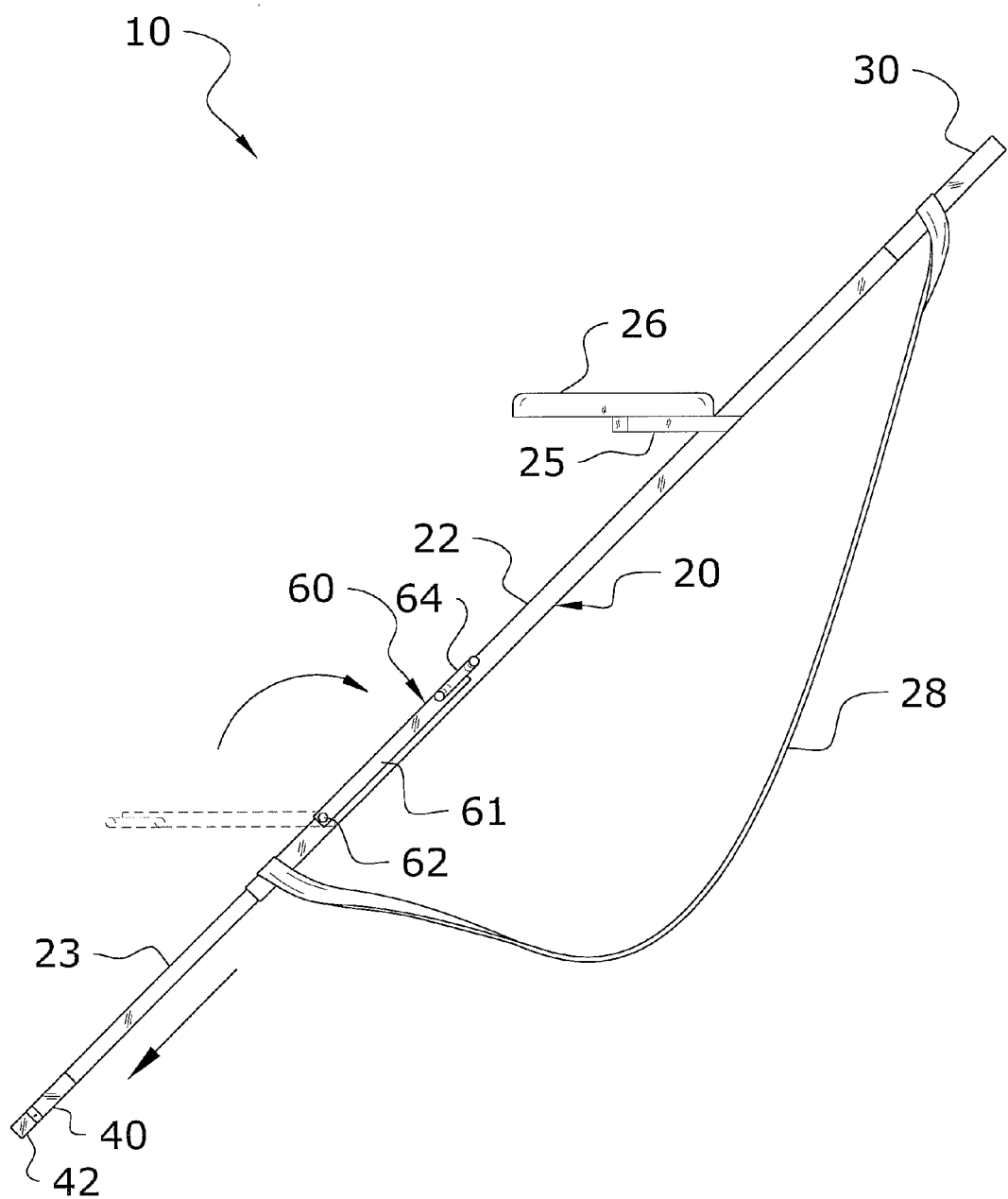
FIG. 5 is a side view of an alternate configuration of the present invention illustrating the channel member of the second accessory support pivoting to a closed position.
Figure 6:
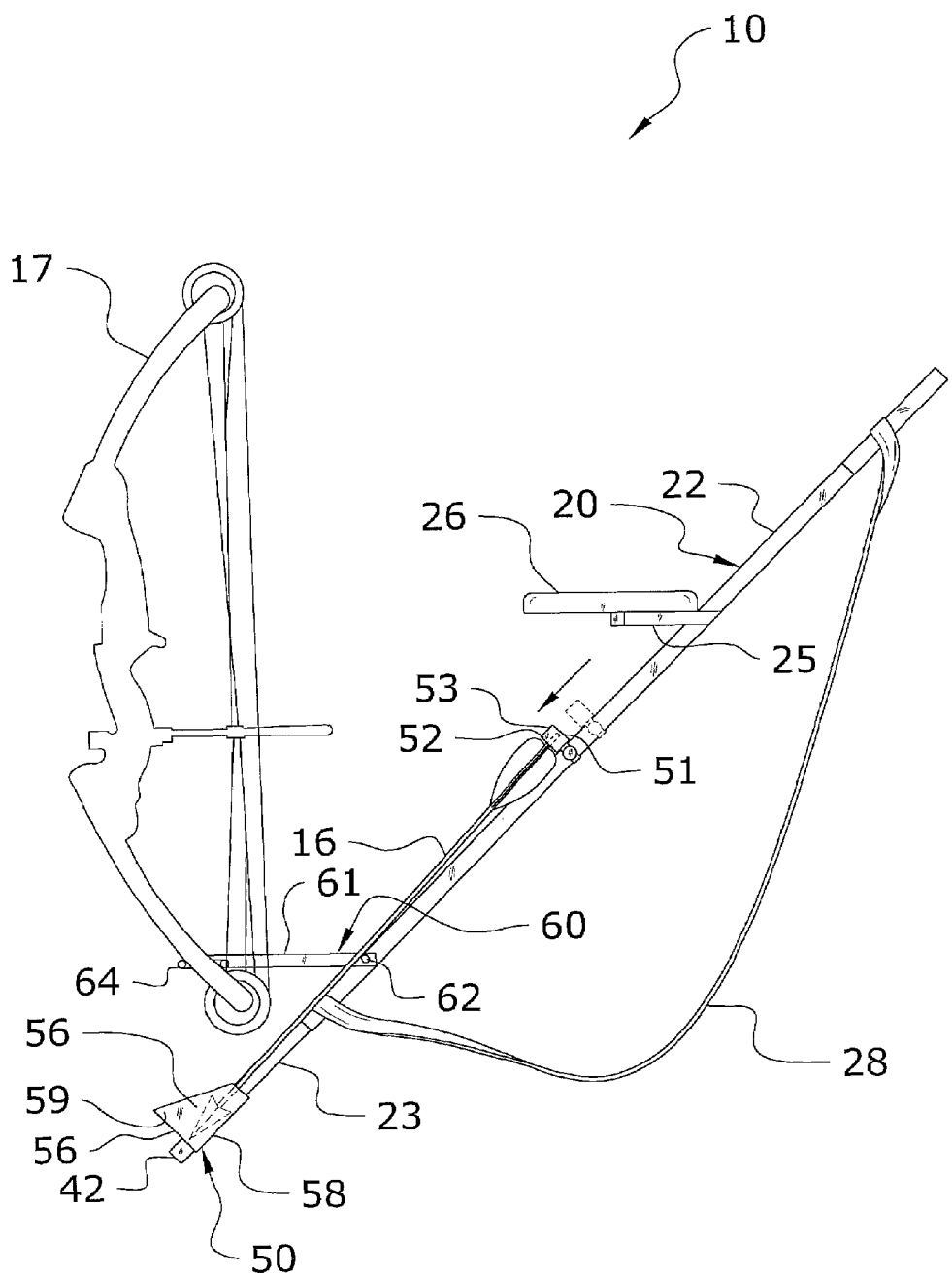
FIG. 6 is a side view of an alternate configuration of the present invention holding a bow and arrows and slidably adjusting the first guard of the first accessory support.
Figure 7:
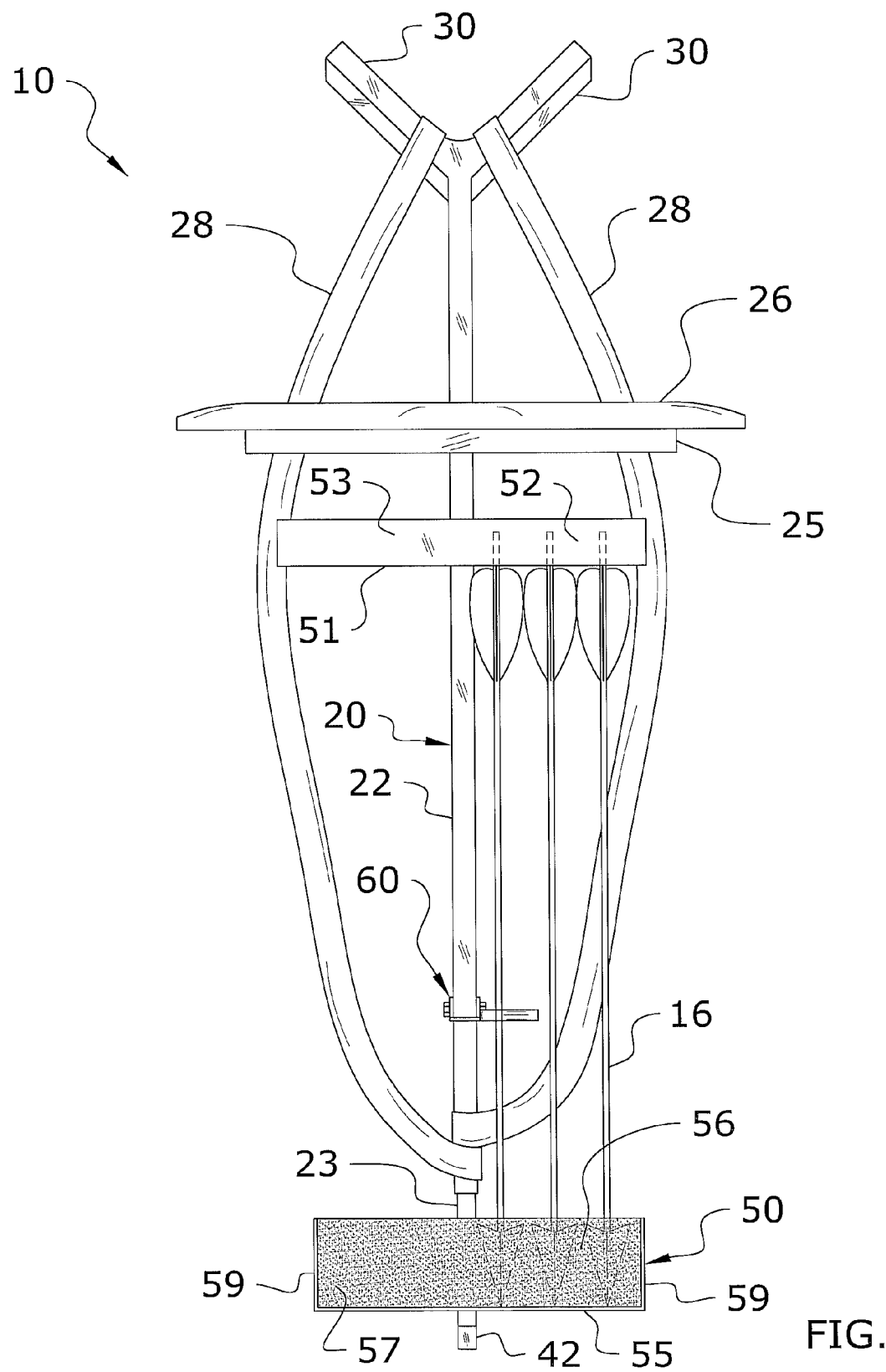
FIG. 7 is a rear view of an alternate configuration of the present invention holding the bow and arrows.

Turning now descriptively to the drawings, in which similar reference characters denote similar elements throughout the several views, FIGS. 1 through 7 illustrate a portable outdoors chair system 10, which comprises an elongated primary support 20 to be leaned against a stationary object 12 from a ground 14 surface in a transverse manner and a seat 26 extending from the primary support 20. The first end of the primary support 20 defines an acute angle with the stationary object 12 towards a lower end of the stationary object 12 and an opposing second end of the primary support 20 defines an acute angle with the stationary object 12 towards the lower end. The seat 26 extends from the stationary support in a manner as to define an acute angle with the primary support 20 towards the second end in a manner to have the seat 26 positioned in a horizontal configuration.

B. Primary Support

The primary support 20 stabilizes the user about the present invention and extends between the stationary object 12 (e.g. tree, fence post, wall, etc.) and the ground 14 surface. The stationary object 12 may be any type of object in any size and configuration that is capable of withstanding the weight of the primary support 20 and the individual sitting upon the primary support 20. The primary support 20 is preferably comprised of a straight elongated configuration. The primary support 20 is also comprised of a lightweight, strong and durable material to withstand the weight of various individuals, to be easily carried and to withstand exposure to harsh weather elements. It is also appreciated that the present invention and any or all of its parts may be colored in various manners, such as in camouflage to disguise the present invention while nature watching or hunting.

The primary support 20 may be comprised of various cross-sectional configurations, such as but not limited to square tubular or tubular. The primary support 20 is also preferably adjustable in length to accommodate different height individuals and to be positioned in a stable manner upon the stationary object 12. It is appreciated that different stationary objects 12 may require the primary support 20 to be leaned against the stationary object 12 at different heights to accommodate for the shape of the stationary object 12.

In the preferred embodiment, the primary support 20 includes a first elongated member 22 and a second elongated member 23, wherein the first elongated member 22 and the second elongated member 23 may be secured to each other at different places and be slidable with respect to one another so as to telescopingly adjust the primary support 20. It is appreciated that various locking structures may be utilized to secure the first elongated member 22 to the second elongated member 23.

The primary support 20 also preferably includes a seat support 25 extending from the first elongated member 22 of the primary support 20. The seat support 25 extends outwardly from the primary support 20 so as to form a right angle with the ground 14 surface when the primary support 20 is transverse with the ground 14 and leaning upon the stationary object 12. The seat support 25 thus forms an acute angle with the primary support 20 towards the lower end of the primary support 20. The seat support 25 is positioned in such a manner so that the user may sit level with the ground 14 and in a comfortable position and thus not be leaning back towards the stationary object 12 or down towards the ground 14.

A seat 26 is attached to the seat support 25. The seat 26 is comprised of a weatherproof configuration to withstand rain, snow and other precipitation. The seat 26 is also comprised of a padded configuration to provide a comfortable spot for the user to sit for extended periods of time. The seat 26 may be comprised of various shapes, such as but not limited to square, rectangular or circular.

The present invention also preferably includes at least one and preferably a pair of straps 28 extending longitudinally with the primary support 20. The straps 28 serve as backpack straps 28 and allow the user to easily transport the present invention from place to place. The straps 28 may also be adjustable in length so as to accommodate different size individuals and carrying styles. The straps 28 may be attached to the present invention in various locations all which preferably extend along the length of the primary support 20. In the preferred embodiment, the upper end of the straps 28 is secured to the first brace 30 (i.e. upper brace) and the lower end of the straps 28 is secured to the lower end of the primary support 20, wherein both the straps 28 are positioned upon opposing sides of the primary support 20.

C. Braces

The present invention preferably includes a pair of braces 30, 40, wherein the first brace 30 is positioned near the upper end of the primary support 20 extending from the first elongated member 22 to rest and stabilize the primary support 20 upon the stationary object 12. The second brace 40 is positioned near the lower end of the primary support 20 extending from the second elongated member 23 to rest and stabilize the primary support 20 upon the ground 14.

The first brace 30 is preferably comprised of a V-shaped configuration extending outwardly from the primary support 20 and preferably in a straight outward manner with respect to the primary support 20. The second brace 40 is also preferably comprised of a V-shaped configuration extending outwardly from the primary support 20 and preferably in a straight outward manner with respect to the primary support 20. The second brace 40 further preferably includes a center member 42 extending between the V-shaped members of the second brace 40. The second brace 40 protrudes slightly within and grasps the ground 14 when stabilizing the primary support 20 between the stationary object 12 and the ground 14. It is appreciated that the braces 30, 40 may be comprised of various alternate configurations, such as a straight extension of the primary support 20 and not a V-shaped configuration.

D. First Accessory Support (Arrow Support)

The present invention preferably includes multiple accessory supports 50, 60 to secure multiple accessories. In one embodiment, the present invention is primarily used for a chair while bow 17 hunting. In this embodiment, the present invention includes a first accessory support 50 for supporting arrows 16, such as a quiver and a second accessory support 60 for supporting a bow 17.

The first accessory support 50 preferably includes a first guard 51 and a second guard 55 to secure both ends of the arrows 16 (i.e. nock and point). The first guard 51 is preferably positioned just below the seat 26 (i.e. towards the lower end of the primary support 20). The first guard 51 includes a first receiving area 52 to receive and secure the arrow 16 near the nock and fletching of the arrow 16. The first guard 51 preferably shields the nock of the arrow 16 from the front via a front plate 53 and allows the nock of the arrow 16 to be released towards the rear of the first guard 51. The first guard 51 may be large enough to secure multiple arrows 16 within. The first guard 51 may also adjust along the primary support 20 to accommodate for various arrow 16 lengths.

The first accessory support 50 also includes a second guard 55 positioned adjacent the lower end of the primary support 20 and just above the second brace 40.). The second guard 55 includes a second receiving area 56 to receive and secure the arrow 16 near the point (i.e. broad head, field point) of the arrow 16. The second guard 55 preferably shields the point of the arrow 16 from the rear and allows the point of the arrow 16 to be released towards the front of the second guard 55. The second guard 55 may be large enough to secure multiple arrows 16 within.

The second guard 55 also includes side plates 59 and rear plate 58 to shield the points from the rear of the second guard 55. The side plates 59 and rear plate 58 help to prevent the points of the arrows 16 from coming into contact with the user while the user is transporting the present invention. The second guard 55 also preferably includes a protective material 57 (e.g. felt) lining the inside of the second guard 55 to prevent the point of the arrow 16 from becoming dull when positioned within the second guard 55.

E. Second Accessory Support (Bow Support)

The second accessory support 60, as stated earlier, may support the bow 17 utilized to shoot the arrows 16 in one embodiment of the present invention. The second accessory support 60 preferably includes a channel member 61 extending from the lower end of the primary support 20. The channel member 61 is preferably movably connected to the primary support 20 to adjust for different positions in which the user would like their bow 17 supported.

The channel member 61 is further preferably pivotally connected to the primary support 20 at a pivot point 62 adjacent the primary support 20. The channel member 61 is further preferably comprised of a similar shaped configuration as the primary support 20 so that when the channel member 61 is pivoted inwards the channel member 61 receives the primary support 20 within to fit as close as possible to the primary support 20.

A holder 64 preferably extends from the channel member 61 opposite the primary support 20. The holder 64 may be comprised of various configurations depending on what is desired to be secured with the second accessory support 60. In the bow 17 embodiment, the holder 64 is comprised of a U-shaped configuration to receive the lower limb of the bow 17 or another configuration common with bow 17 holders 64. The holder 64 extends outward from the side of the channel member 61 so as not to be in the way of the user when the user is sitting upon the seat 26 of the present invention. The holder 64 and second accessory support 60 allow the bow 17 to be supported in an upright manner without the need for the user to hold onto the bow 17.

F. Operation of Preferred Embodiment

In use, the primary support 20 is angled (or leaned) against the stationary object 12 in a manner to keep the seat 26 parallel with the ground 14. The primary support 20 may need to be adjusted in length to properly lean against the stationary object 12. The first brace 30 is positioned in a stable manner upon the stationary object 12 and the second brace 40 is partially inserted within the ground 14 and stabilized upon the ground 14. The user may now sit upon the seat 26 of the present invention. The user may also store their arrows 16 and bow 17 in the accessory supports 50, 60 as desired.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A portable outdoors chair system, comprising:
   an elongated primary support including a first end and a second end, wherein said first end is opposite said second end;
   wherein said first end includes a first brace linearly extending from said primary support, wherein said first brace is comprised of a V-shaped configuration adapted for stabilizing said first end of said elongated primary support against a stationary object;
   wherein said second end includes a second brace linearly extending from said primary support, wherein said second brace is comprised of a V-shaped configuration adapted for stabilizing said second end of said elongated primary support upon a ground surface; and
   a seat extending from said primary support;
   wherein said seat extends from said stationary support in a manner as to define an acute angle with said primary support towards said second end in a manner to have said seat positioned in a horizontal configuration.

2. The portable outdoors chair system of claim 1, wherein said primary support is adjustable in length.

3. The portable outdoors chair system of claim 2, wherein said primary support telescopingly adjusts.

4. The portable outdoors chair system of claim 1, wherein said second brace includes a center member extending between said V-shape of said second brace.

5. The portable outdoors chair system of claim 1, including at least one strap extending along a longitudinal axis of said primary support for carrying said primary support.

6. The portable outdoors chair system of claim 5, wherein said at least one strap extends from said first end to said second end of said primary support.

7. The portable outdoors chair system of claim 5, wherein said at least one strap includes a first strap and a second strap.

8. The portable outdoors chair system of claim 1, including at least one accessory support attached to said primary support.

9. The portable outdoors chair system of claim 8, wherein said at least one accessory support is comprised of a quiver configuration for holding a plurality of arrows.

10. The portable outdoors chair system of claim 8, wherein said at least one accessory support includes a first guard and a second guard distally separated and extending from said primary support.

11. The portable outdoors chair system of claim 8, wherein said at least one accessory support is comprised of a bow attachment for holding a bow.

12. The portable outdoors chair system of claim 8, wherein said at least one accessory support includes a pivotally attached member.

13. The portable outdoors chair system of claim 12, wherein said at least one accessory support includes a U-shaped member extending from said pivotally attached member.

14. The portable outdoors chair system of claim 1, wherein said first brace and said second brace are comprised of an open-ended structure.

15. A portable outdoors chair system, comprising:
   a primary support including a first end and a second end, wherein said primary support is comprised of an elongated configuration;

wherein said primary support telescopingly adjusts in length;

a first brace extending from said first end of said primary support;

a second brace extending from said second end of said primary support, wherein said first brace and said second brace are comprised of V-shaped configurations;

a seat extending from said primary support;

wherein said seat extends from said primary support in a manner as to define an acute angle with said primary support towards said second end in a manner to have said seat positioned in a horizontal configuration;

at least one strap extending along a longitudinal axis of said primary support for carrying said primary support;

a first accessory support attached to said primary support;

wherein said first accessory support is comprised of a quiver configuration for holding a plurality of arrows; and a second accessory support attached to said primary support;

wherein said second accessory support is comprised of a bow attachment for holding a bow.

16. A portable outdoors chair system, comprising:

a primary support including a first end and a second end, wherein said primary support is comprised of an elongated configuration;

wherein said primary support telescopingly adjusts in length;

a first brace extending upwardly from said first end of said primary support;

a second brace extending downwardly from said second end of said primary support, wherein said first brace and said second brace are comprised of V-shaped configurations; and a seat extending from said primary support;

wherein said seat extends from said primary support in a manner as to define an acute angle with said primary support towards said second end in a manner to have said seat positioned in a horizontal configuration.

17. The portable outdoors chair system of claim 16, including an accessory support attached to said primary support, wherein said accessory support is comprised of a quiver configuration for holding a plurality of arrows.

18. The portable outdoors chair system of claim 16, including at least one strap extending along a longitudinal axis of said primary support for carrying said primary support.

19. The portable outdoors chair system of claim 16, including at least one accessory support attached to said primary support.

20. The portable outdoors chair system of claim 16, wherein said first brace and said second brace are comprised of an open-ended structure.

* * * * *